United States Patent
Huang et al.

(10) Patent No.: US 10,551,683 B2
(45) Date of Patent: Feb. 4, 2020

(54) DISPLAY PANEL AND METHOD FOR FABRICATING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Haiqin Huang, Beijing (CN); Xiaopeng Cui, Beijing (CN); Jiarong Liu, Beijing (CN); Junwei Wang, Beijing (CN); Haifeng Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/768,826

(22) PCT Filed: Aug. 18, 2017

(86) PCT No.: PCT/CN2017/097978
§ 371 (c)(1),
(2) Date: Apr. 16, 2018

(87) PCT Pub. No.: WO2018/033131
PCT Pub. Date: Feb. 22, 2018

(65) Prior Publication Data
US 2018/0314084 A1    Nov. 1, 2018

(30) Foreign Application Priority Data
Aug. 19, 2016  (CN) .......................... 2016 1 0696461

(51) Int. Cl.
G02F 1/1339 (2006.01)
G02F 1/1335 (2006.01)
C09J 4/00 (2006.01)

(52) U.S. Cl.
CPC .............. *G02F 1/1339* (2013.01); *C09J 4/00* (2013.01); *G02F 1/133528* (2013.01); *G02F 1/133512* (2013.01); *G02F 2001/133531* (2013.01)

(58) Field of Classification Search
CPC ............. G02F 1/1335; G02F 1/133512; G02F 1/1339; G02F 1/136209; G02F 1/133528;
(Continued)

(56) References Cited

U.S. PATENT DOCUMENTS 5,706,131 A    1/1998  Ichimura et al.
6,541,185 B1 *  4/2003  Matsunaga .......... G02B 5/3016
                                                  349/15
(Continued)

FOREIGN PATENT DOCUMENTS

CN      1114512 A       1/1996
CN    101075047 A      11/2007
(Continued)

OTHER PUBLICATIONS

Office Action received for Chinese Patent Application No. 201610696461.6, dated Dec. 22, 2017, 11 pages (5 pages of English Translation and 6 pages of Office Action).
(Continued)

*Primary Examiner* — Thoi V Duong
(74) *Attorney, Agent, or Firm* — Womble Bond Dickinson (US) LLP

(57) ABSTRACT

A display panel and a method for fabricating the same are disclosed. The display panel includes a first substrate, a second substrate which is arranged oppositely to the first
(Continued)

substrate, a frame sealant which is arranged between the first substrate and the second substrate, and a black matrix which is arranged on the second substrate. A projection of the black matrix on the first substrate does not overlap a projection of the frame sealant on the first substrate. This facilitates completely exposing the frame sealant to a curing UV light. This improves a curing efficiency of the frame sealant, increases the adhesiveness of the frame sealant, and avoids the problem of liquid crystal leakage due to breakage of the frame sealant.

11 Claims, 2 Drawing Sheets

(58) Field of Classification Search
CPC ...... G02F 1/1341; G02F 1/1333; G02F 1/161; G02F 2001/13415; G02F 2001/133531; G02F 2202/023; C09J 4/00
See application file for complete search history.

(56) References Cited

U.S. PATENT DOCUMENTS

| | | |
|---|---|---|
| 2004/0075801 A1 | 4/2004 | Choi et al. |
| 2007/0082145 A1 | 4/2007 | Han et al. |
| 2011/0133170 A1 | 6/2011 | Oh et al. |
| 2013/0286331 A1 | 10/2013 | Chen et al. |
| 2016/0246113 A1 | 8/2016 | Tang |

FOREIGN PATENT DOCUMENTS

| | | |
|---|---|---|
| CN | 100573283 C | 12/2009 |
| CN | 102662275 A | 9/2012 |
| CN | 102929057 A | 2/2013 |
| CN | 104335112 A | 2/2015 |
| CN | 104503152 A | 4/2015 |
| CN | 104777662 A | 7/2015 |
| CN | 106292046 A | 1/2017 |
| KR | 10-2015-0096916 A | 8/2015 |

OTHER PUBLICATIONS

Office Action received for Chinese Patent Application No. 201610696461.6, dated Aug. 18, 2017, 11 pages (5 pages of English Translation and 6 pages of Office Action).

Office Action received for Chinese Patent Application No. 201610696461.6, dated Apr. 24, 2017, 18 pages (10 pages of English Translation and 8 pages of Office Action).

Office Action received for Chinese Patent Application No. 201610696461.6, dated Apr. 2, 2018, 19 pages (14 pages of English Translation and 5 pages of Office Action).

International Search Report and Written Opinion received for PCT Patent Application No. PCT/CN2017/097978, dated Nov. 21, 2017, 19 pages (6 pages of English Translation and 13 pages of Original Document).

* cited by examiner

DISPLAY PANEL AND METHOD FOR FABRICATING THE SAME

RELATED APPLICATIONS

The present application is the U.S. national phase entry of PCT/CN2017/097978, with an international filing date of Aug. 18, 2017, which claims the benefit of Chinese Patent Application No. No.201610696461.6, filed on Aug. 19, 2016, the entire disclosures of which are incorporated herein by reference.

TECHNICAL FIELD

The present disclosure relates to the field of display technologies, and particularly to a display panel and a method for fabricating the same.

BACKGROUND

As shown in FIG. 1, a display device with a narrow bezel generally comprises a black matrix 103 coated on a second substrate 104, and a frame sealant 102 coated on the black matrix 103. UV light 110 is irradiated from the first substrate 101 comprising thin film transistors to cure the frame sealant 102. However, driver circuits and wirings (not shown) in an array substrate block UV light for curing the frame sealant, and this seriously affects the efficiency and effect for curing the frame sealant. The frame sealant is not cured completely, so that the frame sealant suffers from decrease in adhesiveness, or even breakage, which leads to the problem of liquid crystal leakage.

SUMMARY

Embodiments of the present disclosure provide a display panel and a fabricating method, which intend to alleviate or eliminate one or more the above problems or other problems.

In one aspect, embodiments of the present disclosure provide a display panel, comprising: a first substrate, a second substrate which is arranged oppositely to the first substrate, a frame sealant which is arranged between the first substrate and the second substrate, and a black matrix which is arranged on the second substrate, wherein a projection of the black matrix on the first substrate does not overlap a projection of the frame sealant on the first substrate.

In this embodiment, the black matrix is absent at a position corresponding to the frame sealant of the display panel. Namely, the projection of the black matrix on the first substrate does not overlap the projection of the frame sealant on the first substrate. As a result, the frame sealant is completely exposed to the curing UV light. This improves the curing efficiency of the frame sealant, increases the adhesiveness of the frame sealant, and avoids the problem of liquid crystal leakage due to breakage of the frame sealant.

In an exemplary embodiment, the black matrix is arranged on a side of the second substrate facing the first substrate, and the projection of the black matrix on the first substrate is complementary with the projection of the frame sealant on the first substrate.

In an exemplary embodiment, the display panel further comprises a polarizing sheet on the second substrate, wherein the frame sealant comprises a polarizing material, and a deflection angle of the polarizing material is perpendicular with a deflection angle of the polarizing sheet.

In this embodiment, by arranging the frame sealant which comprises the polarizing material with the deflection angle perpendicular with the deflection angle of the polarizing sheet, the combination of the frame sealant and the polarizing sheet is equivalent to a black matrix. Thus, apart from increasing the curing efficiency of the frame sealant, this solves the problem of light leakage in the display panel.

In an exemplary embodiment, the polarizing sheet is arranged on a side of the second substrate away from the first substrate, and a projection of the polarizing sheet on the first substrate at least covers the projection of the frame sealant on the first substrate.

In an exemplary embodiment, a weight percentage of the polarizing material in the frame sealant is about smaller than or equal to 40%.

In an exemplary embodiment, a weight percentage of the polarizing material in the frame sealant is about larger than or equal to 20% and smaller than or equal to 25%.

In an exemplary embodiment, the polarizing material comprises polarizing groups and a chalcone structure.

In an exemplary embodiment, the display panel further comprises: a polarizing sheet and a polarizing film which are arranged on the second substrate, wherein a deflection angle of the polarizing film is perpendicular with the deflection angle of the polarizing sheet, and projections of the polarizing sheet and the polarizing film on the first substrate at least cover the projection of the frame sealant on the first substrate.

In this embodiment, since the deflection angle of the polarizing film is perpendicular with the deflection angle of the polarizing sheet, the effect of black matrix is realized. Thus, apart from increasing the curing efficiency of the frame sealant, this solves the problem of light leakage in the display panel.

The term "the deflection angle of the polarizing sheet" as used herein refers to the deflection angle of light after passing the polarizing sheet. Similarly, the term "the deflection angle of the polarizing material" refers to the deflection angle of light after passing the polarizing material, and the term "the deflection angle of the polarizing film" refers to the deflection angle of light after passing the polarizing material.

In an exemplary embodiment, the polarizing film is arranged between the polarizing sheet and the second substrate.

In an exemplary embodiment, the polarizing film comprises a photoactive molecular layer away from the frame sealant and a dichroic molecular layer close to the frame sealant.

In another aspect, embodiments of the present disclosure provide a method for fabricating a display panel, comprising:

coating a frame sealant on a first substrate and coating a black matrix on a second substrate; and assembling the first substrate and the second substrate by using the frame sealant, wherein a projection of the frame sealant on the first substrate does not overlap a projection of the black matrix on the first substrate.

In this embodiment, the frame sealant is coated on the second substrate opposite to the first substrate at a position where the black matrix is not coated. Namely, the projection of the black matrix on the first substrate does not overlap the projection of frame sealant on the first substrate, so that the frame sealant is completely exposed to curing UV light. This improves the curing efficiency of the frame sealant, increases the adhesiveness of the frame sealant, and avoids the problem of liquid crystal leakage due to breakage of the frame sealant.

In an exemplary embodiment, the frame sealant comprises a polarizing material, and after assembling the first substrate and the second substrate, the method further comprises: forming a polarizing sheet on the second substrate, wherein a projection of the polarizing sheet on the first substrate at least covers the projection of the frame sealant on the first substrate.

In an exemplary embodiment, a weight percentage of the polarizing material in the frame sealant is about smaller than or equal to 40%.

In an exemplary embodiment, a weight percentage of the polarizing material in the frame sealant is about larger than or equal to 20% and smaller than or equal to 25%.

In an exemplary embodiment, the polarizing material comprises polarizing groups and a chalcone structure.

In an exemplary embodiment, coating the frame sealant on the first substrate and coating the black matrix on the second substrate comprises: coating a frame sealant which comprises a polarizing material on the first substrate, coating the black matrix on the second substrate, and coating a polarizing precursor on a side of the second substrate opposite to the black matrix, and wherein after assembling the first substrate and the second substrate, the method further comprises: forming a polarizing sheet on the second substrate, wherein a deflection angle of the polarizing sheet is perpendicular with a deflection angle of the polarizing material; and irradiating the polarizing precursor to form a polarizing film.

In an exemplary embodiment, after assembling the first substrate and the second substrate, the polarizing precursor is irradiated with polarized UV light to form a polarizing film.

In an exemplary embodiment, during assembling the first substrate and the second substrate, the coated polarizing precursor is irradiated with polarized UV light to form a polarizing film.

In this embodiment, while the first substrate and the second substrate are being assembled, the coated polarizing precursor is irradiated with the polarized UV light to form the polarizing film, so that the times of irradiating UV light is reduced, and energy is saved. Meanwhile, since the deflection angle of the polarizing film is perpendicular with the deflection angle of the polarizing sheet, the effect of the black matrix is realized. Apart from increasing the curing efficiency of the frame sealant, this solves the problem of light leakage in the display panel.

In an exemplary embodiment, a deflection angle of the polarizing film is perpendicular with the deflection angle of the polarizing sheet, and projections of the polarizing sheet and the polarizing film on the first substrate at least cover the projection of the frame sealant on the first substrate.

In an exemplary embodiment, the polarizing film comprises a photoactive molecular layer away from the frame sealant and a dichroic molecular layer close to the frame sealant.

DETAILED DESCRIPTION OF EMBODIMENTS

Figure 1:
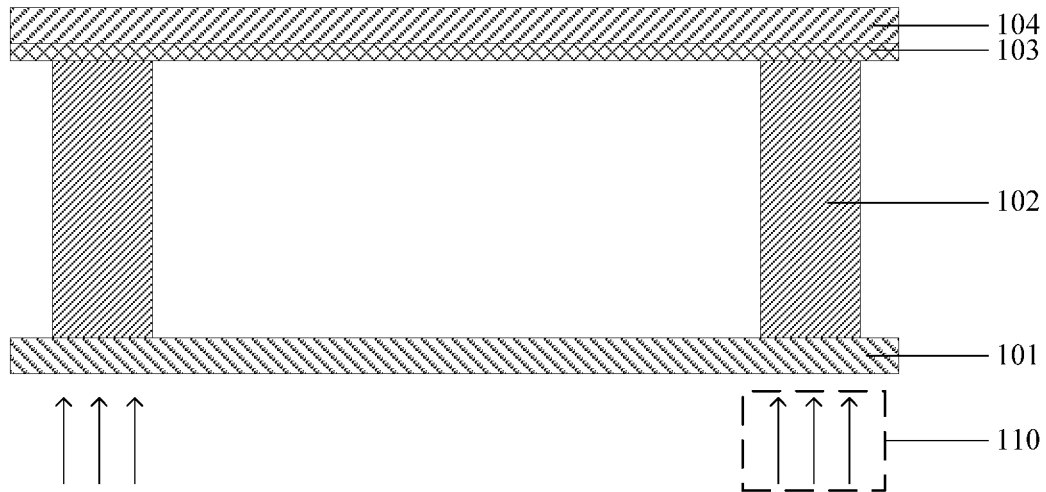
FIG. 1 is a cross-sectional view for illustrating a display panel.

Embodiments of the present disclosure provide a display panel and a fabricating method, in which the arrangement of the black matrix in the display panel is modified, so that the frame sealant is completely exposed to curing UV light. This improves the curing efficiency of the frame sealant, increases the adhesiveness of the frame sealant, and avoids the problem of liquid crystal leakage due to breakage of the frame sealant.

To make the objects, the technical solutions and the advantages of embodiments of the present disclosure more apparent, the technical solutions of the embodiments of the present disclosure will be described in detail hereinafter in conjunction with the drawings of the embodiments of the present disclosure. Apparently, the embodiments described hereinafter are only some embodiments of the present disclosure, but not all embodiments. Based the embodiments described hereinafter, other embodiments obtained by those skilled in the art should fall within the scope of the present disclosure.

Reference numerals: 101, 201, 301, 401 first substrate; 102, 202, 302, 402 frame sealant; 103, 203, 303, 403 black matrix; 104, 204, 304, 404 second substrate; 110, 210 UV light; 305, 405 polarizing sheet; 406 polarizing film.

Figure 2A:
FIG. 2A is a cross-sectional view for illustrating a display panel in an embodiment of the present disclosure.

As shown in FIG. 2A, embodiments of the present disclosure provide a display panel. The display panel comprises: a first substrate 201, a second substrate 204 which is arranged oppositely to the first substrate 201, a frame sealant 202, and a black matrix 203 which is arranged on the second substrate 204. A projection of the black matrix 203 on the first substrate 201 does not overlap a projection of the frame sealant 202 on the first substrate 201. The first substrate 201 and the second substrate 204 are bonded with each other by means of the frame sealant 202. As shown, the black matrix 203 is arranged on a side of the second substrate 204 facing the first substrate 201, i.e., the frame sealant 202 and the black matrix 203 are arranged on a same side of the second substrate 204.

Figure 2B:
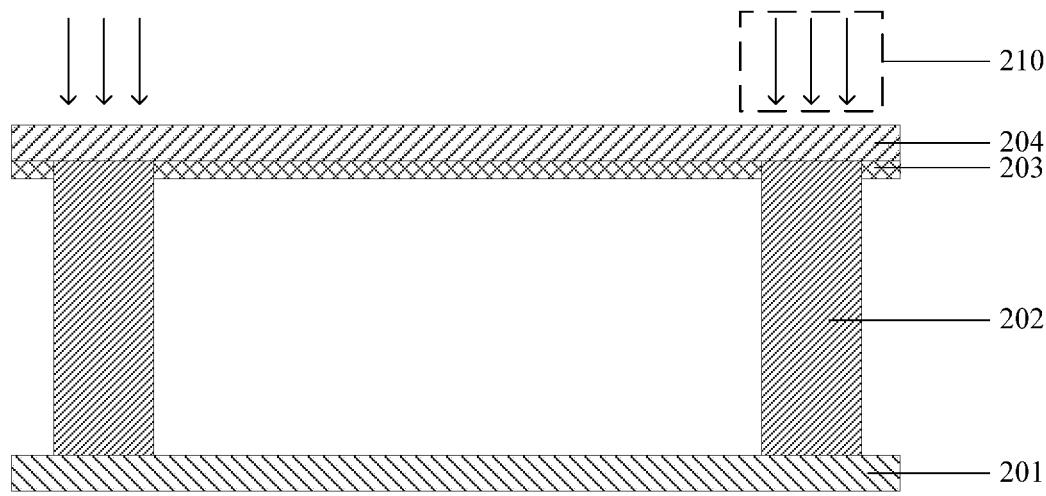
FIG. 2B is a view for illustrating a principle of a display panel in an embodiment of the present disclosure.

As shown in FIG. 2B, in this embodiment, since the black matrix 203 is not arranged at a position to which the frame sealant 202 corresponds, UV light 210 for curing the frame sealant 202 can be irradiated from the second substrate 204. UV light 210 can directly irradiate the frame sealant 202, so as to improve the efficiency for curing the frame sealant. This increases the adhesiveness of the frame sealant, and avoids the problem of liquid crystal leakage due to breakage of frame sealant. Since UV light 210 is not irradiated from the first substrate 201, the requirements for arranging driver circuits and wirings of thin film transistors are reduced. This enables to arrange driver circuits and wirings of thin film transistors in a denser manner, so that a narrower bezel of the display panel is realized.

Figure 2C:
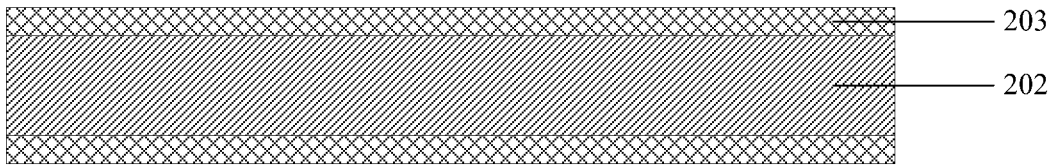
FIG. 2C is a top view for illustrating a display panel along a line AA' in FIG. 2A in an embodiment of the present disclosure.

FIG. 2C shows in a top view the position relationship between the frame sealant 202 and the black matrix 203. In FIG. 2C, the horizontal direction corresponds to a direction in which the frame sealant 202 extends, and the vertical direction is perpendicular with the direction in which the frame sealant 202 extends. As shown in FIG. 2C, in a peripheral region of the display panel, the projection of the black matrix 203 on the first substrate 201 is complementary with the projection of the frame sealant 202 on the first substrate 201. The term "complementary" as used herein means that in the peripheral region of the display panel, the projection of the frame sealant on the first substrate exactly fills the region left by the projection of the black matrix on the first substrate. This not only ensures that UV light 210 directly irradiates the frame sealant 202, but also avoids the problem of light leakage in the display panel due to any gap between the frame sealant 202 and the black matrix 203.

To further overcome the problem of light leakage in the display panel, embodiments of the present disclosure provide the display panel in two constructions, as described in detail hereinafter with reference to FIGS. 3-4. It is noted that reference numerals differing by 100 or its integer multiples in FIGS. 2A, 2B, 2C, 3, 4 indicate identical or similar components or elements.

Figure 3:
FIG. 3 is a cross-sectional view for illustrating a display panel in an embodiment of the present disclosure.

As compared with the embodiment shown in FIG. 2A, in the embodiment shown in FIG. 3, the display panel further comprises a polarizing sheet 305. A projection of the polarizing sheet 305 on a first substrate 301 at least completely covers a projection of a frame sealant 302 on the first substrate 301. In an embodiment, the projection of the polarizing sheet 305 on the first substrate 301 completely coincides with the projection of the frame sealant 302 on the first substrate 301. In an alternative embodiment, the projection of the polarizing sheet 305 on the first substrate 301 contains the projection of the frame sealant 302 on the first substrate 301, i.e. the projection area of the polarizing sheet 305 on the first substrate 301 is larger than that of the frame sealant 302 on the first substrate 301.

As shown in FIG. 3, the polarizing sheet 305 is arranged on a side of the second substrate 305 away from the first substrate 301. i.e., the polarizing sheet 305 and the black matrix 303 are arranged on different sides of the second substrate 304.

In an embodiment, the frame sealant 302 comprises a polarizing material. A weight percentage of the polarizing material in the frame sealant is about smaller than or equal to 40%. For example, the weight percentage of the polarizing material in the frame sealant is about larger than or equal to 20% and smaller than or equal to 25%. A deflection angle of the polarizing material is perpendicular with a deflection angle of the polarizing sheet 305.

In embodiments of the present disclosure, the frame sealant comprises the polarizing material, and the deflection angle of the polarizing material is perpendicular with the deflection angle of the polarizing sheet. In this way, the combination of the frame sealant and the polarizing sheet realizes the effect of a black matrix. Thus, apart from increasing the curing efficiency of the frame sealant, this solves the problem of light leakage in the display panel.

For example, the polarizing material comprises polarizing groups and a chalcone structure. When the polarized UV light irradiates the chalcone structure, the polarizing groups is imparted with a deflection angle which is perpendicular with the deflection angle of polarized UV light.

In embodiments of the present disclosure, the polarizing material is not limited to polarizing groups and the chalcone structure, but can comprise any polarizing material which is capable of generating polarization effect, so that it can be combined with the polarizing sheet to realize the light blocking effect of the black matrix.

Figure 4:
FIG. 4 is a cross-sectional view for illustrating a display panel in an embodiment of the present disclosure.

As compared with the embodiment shown in FIG. 2A, in the embodiment shown in FIG. 4, the display panel further comprises a second substrate 404, a polarizing sheet 405 which is arranged on the second substrate 404, and a polarizing film 406 with a deflection angle perpendicular with that of the polarizing sheet 405. Projections of the polarizing sheet 405 and the polarizing film 406 on a first substrate 401 at least cover a projection of the frame sealant 402 on the first substrate 401. In an embodiment, the projection of the polarizing film 406 on the first substrate 401 completely coincides with the projection of the frame sealant 402 on the first substrate 401, and the projection of the polarizing sheet 405 on the first substrate 401 is larger than that of the polarizing film 406 on the first substrate 401.

In the embodiment shown in FIG. 4, the polarizing film 406 is arranged between the polarizing sheet 405 and the second substrate 404. In another embodiment, the polarizing film 406 is arranged on a side of the polarizing sheet 405 opposite to the second substrate 404. In yet another embodiment, the polarizing film 405 is arranged between the second substrate 404 and the frame sealant 402.

For example, the polarizing film comprises a photoactive molecular layer away from the frame sealant and a dichroic molecular layer close to the frame sealant. When the polarized UV light irradiates the photoactive molecular layer, the photoactive molecular layer will arrange molecules in the dichroic molecular layer, so that the dichroic molecular layer presents a certain polarization direction.

The frame sealant in the embodiment of FIG. 3 is a frame sealant in an embodiment of the present disclosure. The frame sealant comprises a polarizing material, wherein the weight percentage of the polarizing material in the frame sealant is about larger than 0% and smaller than or equal to 40%. When the weight percentage of the polarizing material in the frame sealant is about larger than or equal to 20% and smaller than or equal to 25%, the frame sealant shows optimum results in term of adhesion effect and avoiding light leakage. The frame sealant in the embodiment of FIG. 4 is a common frame sealant in the art.

In embodiments of the present disclosure, the polarizing film is not limited to the photoactive molecular layer and the dichroic molecular layer. Instead, any polarizing film capable of generating polarization effect can be used to for solving the technical problem intended to solve in the present disclosure.

In an embodiment of the present disclosure, a frame sealant comprises a polarizing material, wherein the weight percentage of the polarizing material in the frame sealant is about smaller than or equal to 40%.

In embodiments of the present disclosure, the polarizing material is added to a weight percentage in the frame sealant, so that when the frame sealant is being cured, the polarizing material in the frame sealant is deflected. Namely, the frame sealant has a certain deflection angle when it is being cured.

In particular, the weight percentage of the polarizing material in the frame sealant is about larger than or equal to 20% and smaller than or equal to 25%.

In particular, the polarizing material comprises polarizing groups and a chalcone structure.

Figure 5:
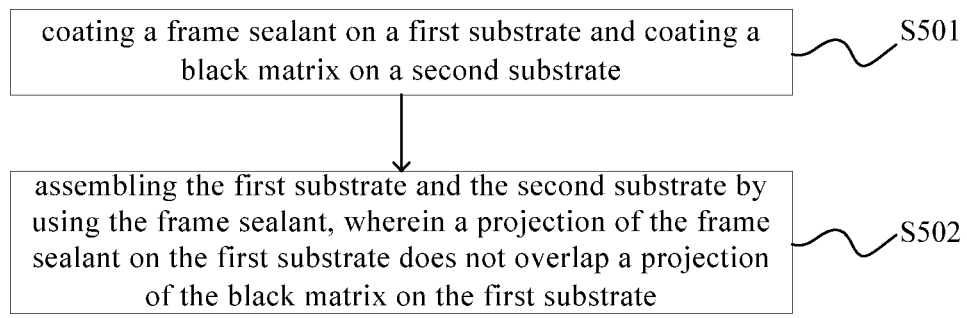
FIG. 5 is a flow chart for illustrating a method for fabricating a display panel in an embodiment of the present disclosure.

As shown in FIG. 5, embodiments of the present disclosure provide a method for fabricating the display panel as described above. The method comprises:

S501, coating a frame sealant on a first substrate and coating a black matrix on a second substrate; and S502, assembling the first substrate and the second substrate by using the frame sealant, wherein a projection of the frame sealant on the first substrate does not overlap a projection of the black matrix on the first substrate.

In embodiments of the present disclosure, the black matrix is not arranged at a position to which the frame sealant of the display panel corresponds. Namely, the projection of the black matrix on the first substrate does not overlap the projection of the frame sealant on the first substrate, so that the frame sealant is completely exposed to curing UV light. This improves the efficiency for curing the frame sealant, increases the adhesiveness of the frame sealant, and avoids the problem of liquid crystal leakage due to breakage of the frame sealant.

Step S502 comprises: assembling the first substrate and the second substrate with polarized UV light, by shielding the non-frame sealant region (black matrix region) with a UV light mask.

If the frame sealant comprises a polarizing material, and the weight percentage of the polarizing material in the frame sealant is about smaller than or equal to 40%, after step S502, the method further comprises:

forming a polarizing sheet on the second substrate, wherein the projection of the polarizing sheet on the first substrate at least covers the projection of the frame sealant on the first substrate, wherein the deflection angle of the polarizing material is perpendicular with that of the polarizing sheet.

In particular, the weight percentage of the polarizing material in the frame sealant is about larger than or equal to 20% and smaller than or equal to 25%.

In particular, the polarizing material comprises polarizing groups and a chalcone structure.

In particular, the method further comprises: coating a polarizing precursor on the second substrate, and irradiating the coating polarizing precursor with polarized UV light to form a polarizing film.

During the assembling process in step S502, the frame sealant is also irradiated with UV light so that the frame sealant is cured. Therefore, the step of irradiating the coated polarizing precursor with polarized UV light to form the polarizing film can be performed at a same time as assembling the first substrate and the second substrate. Namely, at the same time as the second substrate on which the polarizing precursor has been coated and the first substrate on which the frame sealant has been coated are assembled, the polarizing precursor and the frame sealant are irradiated with the polarized UV light, so as to form the polarizing film with a certain deflection angle and to cure the frame sealant. In an exemplary embodiment, after the first substrate and the second substrate are assembled, the polarizing precursor is irradiated to form the polarizing film.

After assembling the first substrate and the second substrate, the method further comprises:

forming a polarizing sheet on the polarizing film, wherein the deflection angle of the polarizing sheet is perpendicular with the deflection angle of the polarizing film, and projections of the polarizing sheet and the polarizing film on the first substrate at least cover the projection of the frame sealant on the first substrate.

According to these steps, not only the efficiency for curing the frame sealant is increased, but also the problem of light leakage in the display panel is solved.

In particular, the polarizing film comprises a photoactive molecular layer and a dichroic molecular layer on the photoactive molecular layer.

To sum up, embodiments of the present disclosure provide a display panel and a fabricating method, in which the arrangement of the black matrix in the display panel is modified, so that the frame sealant is completely exposed to curing UV light. This improves the curing efficiency of the frame sealant, increases the adhesiveness of the frame sealant, and avoids the problem of liquid crystal leakage due to breakage of the frame sealant. By arranging a frame sealant which comprises a polarizing material with a deflection angle perpendicular with that of the polarizing sheet, or by arranging a polarizing sheet which comprises a polarizing precursor with a deflection angle perpendicular with that of the polarizing sheet, the effect of the black matrix is realized. Thus, apart from increasing the curing efficiency of the frame sealant, this solves the problem of light leakage in the display panel. Since the UV light for curing the frame sealant is not irradiated from the first substrate, this reduces the requirements for arranging driver circuits and wirings of thin film transistors. This enables to arrange driver circuits and wirings of thin film transistors in a denser manner, so that a narrower bezel of the display panel is realized.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A display panel, comprising: a first substrate; a second substrate which is arranged oppositely to the first substrate; a frame sealant which is arranged between the first substrate and the second substrate; a black matrix which is arranged on the second substrate, wherein a projection of the black matrix on the first substrate does not overlap a projection of the frame sealant on the first substrate; and a polarizing sheet which is arranged on the second substrate, wherein the frame sealant comprises a polarizing material with a deflection angle perpendicular with a deflection angle of the polarizing sheet.

2. The display panel of claim 1, wherein the black matrix is arranged on a side of the second substrate facing the first substrate, and the projection of the black matrix on the first substrate is complementary with the projection of the frame sealant on the first substrate.

3. The display panel of claim 1, wherein the polarizing sheet is arranged on a side of the second substrate away from the first substrate, and a projection of the polarizing sheet on the first substrate at least covers the projection of the frame sealant on the first substrate.

4. The display panel of claim 1, wherein a weight percentage of the polarizing material in the frame sealant is about smaller than or equal to 40%.

5. The display panel of claim 1, wherein a weight percentage of the polarizing material in the frame sealant is about larger than or equal to 20% and smaller than or equal to 25%.

6. The display panel of claim 1, wherein the polarizing material comprises polarizing groups and a chalcone structure.

7. The display panel of claim 1, further comprising: a polarizing sheet and a polarizing film which are arranged on the second substrate, wherein a deflection angle of the polarizing film is perpendicular with the deflection angle of the polarizing sheet, and projections of the polarizing sheet and the polarizing film on the first substrate at least cover the projection of the frame sealant on the first substrate.

8. The display panel of claim 7, wherein the polarizing film is arranged between the second substrate and the polarizing sheet.

9. The display panel of claim 8, wherein the polarizing film comprises a photoactive molecular layer away from the frame sealant and a dichroic molecular layer close to the frame sealant.

10. A method for fabricating a display panel, comprising:
coating a frame sealant which comprises a polarizing material on a first substrate and coating a black matrix on a second substrate;
assembling the first substrate and the second substrate by using the frame sealant, wherein a projection of the frame sealant on the first substrate does not overlap a projection of the black matrix on the first substrate; and
forming a polarizing sheet on the second substrate, wherein a deflection angle of the polarizing sheet is perpendicular with a deflection angle of the polarizing material.

11. The method of claim 10, wherein coating the frame sealant on the first substrate and coating the black matrix on the second substrate comprises: coating a frame sealant which comprises a polarizing material on the first substrate, coating the black matrix on the second substrate, and coating a polarizing precursor on a side of the second substrate opposite to the black matrix.

* * * * *